UNITED STATES PATENT OFFICE.

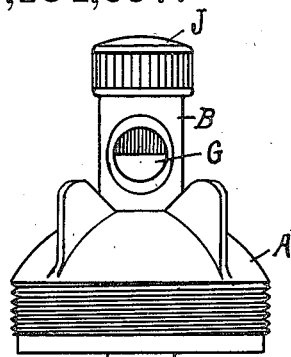
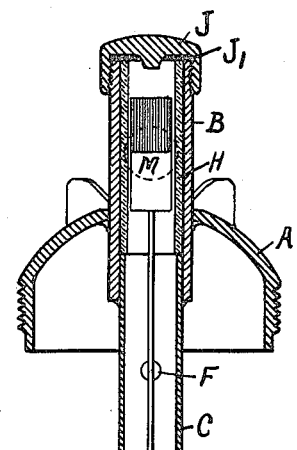
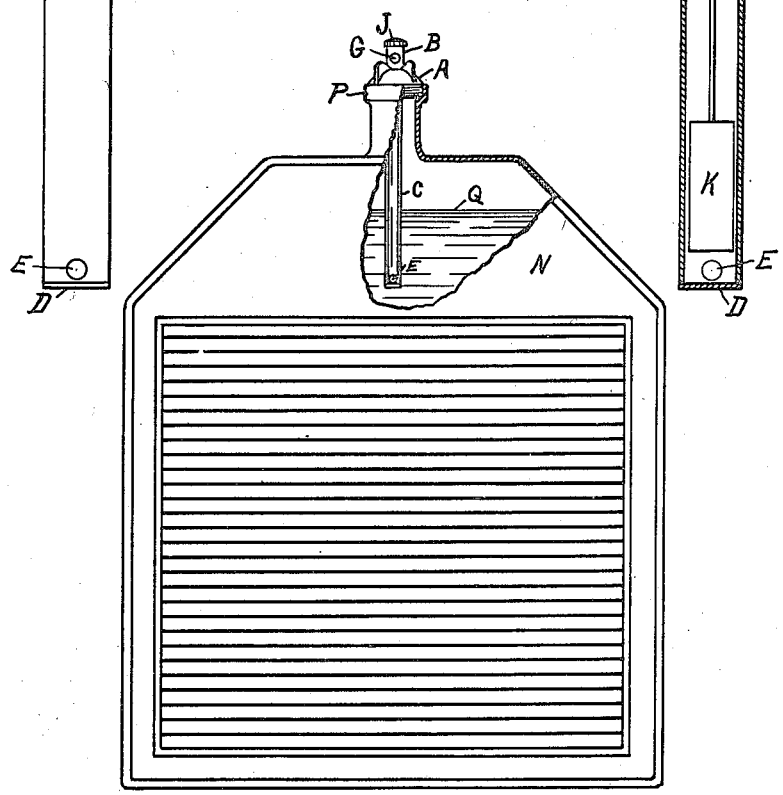

FRED B. COREY, OF EDGEWOOD, PENNSYLVANIA.

INDICATOR FOR AUTOMOBILE-RADIATORS.

1,154,097.

Specification of Letters Patent.  Patented Sept. 21, 1915.

Application filed March 19, 1915.  Serial No. 15,425.

*To all whom it may concern:*

Be it known that I, FRED B. COREY, a citizen of the United States, residing at Edgewood, in the county of Allegheny and State of Pennsylvania, have invented certain new and useful Improvements in Indicators for Automobile-Radiators, of which the following is a specification.

My invention relates to safety devices for automobile radiators and especially to such devices as are adapted to indicate when the water level within the radiator has fallen to a predetermined point.

The object of my invention is to provide a means to indicate to the driver of the automobile when the water level within the radiator has fallen so as to approach the limit for safe and satisfactory operation of the automobile engine, and thus to secure a replenishment of the water before any injury has been done to the mechanism.

My invention consists of a closed tube extending through the radiator cap, a glass covered aperture near the top of the said tube, a float within the tube, an indicating device adjacent the said aperture and carried by the said float, the said indicator being arranged to show a warning signal through the said aperture when the water level within the tube is below a predetermined point and constructed openings in the tube to permit water to flow to and from the interior of the said tube when the lower end of the tube is within the radiator.

In the drawings which illustrate my invention, Figure 1 is a side view of a radiator cap fitted with my invention. Fig. 2 is a longitudinal section of the device shown in Fig. 1. Fig. 3 is a front view of an automobile radiator, partially in section, showing the preferred method of application of my invention.

In the drawings, A represents the removable cap of an automobile radiator.

B is a metal tube extending through the cap A and attached thereto by soldering or otherwise.

C is a tubular extension of the tube B, preferably of reduced diameter.

D is a cap or disk closing the lower end of the tube C.

E is a small hole through the wall of the tube C below the normal water level and F is a similar hole above the normal water level.

G is an aperture in the tube B, so placed as to enable a clear view of anything within the tube at that height.

H is a glass tube within the metal tube B, resting on the upper end of the tube C and covering the aperture G.

J is a removable cap closing the upper end of the tube B and holding the glass tube H in place.

$J_1$ is a washer of packing material that is used to avoid breaking the glass tube H when screwing the cap J into position.

K is a float that may be made of cork treated with an impervious varnish that will withstand the action of hot water and of all chemicals that may be used to prevent freezing, or this float may be constructed of hollow metal.

L is a wire, preferably of aluminum, attached to the upper end of the float K.

M is an indicating body of light weight attached to the upper end of the wire L. In my preferred construction, the upper half of the body M is red as indicated by the vertical shade lines and the lower half is white. The proportions are such that when the float K is in the upper extreme position, the white portion of the body M is opposite the aperture G and when the float K is in the lower extreme position the red portion of the body M is opposite the aperture G, the total movement of the float K being only that necessary to accomplish this change of color indication.

Referring to Fig. 3, N is the radiator of an automobile, a portion near the top of the radiator being cut away to show the indicating device in the interior of the radiator body and the water therein. The radiator cap A is screwed into its socket P at the top of the radiator N. When the upper surface Q of the water is well above the limit for satisfactory operation, the float is raised to such a height that the indicating body M is held against the cap J and the white portion of the body M is visible through the aperture G. As the water line Q is lowered, water flows out of the tube C through the constricted opening E, air entering the tube C at the same time through the opening F. When the water line Q has lowered to a predetermined point, the float K descends and the red portion of the body M becomes visible through the aperture G. This serves to indicate to the operator that the water supply should be replenished.

As the automobile travels along a roadway, the water in the interior of the radiator N is agitated so that the water line Q is not fixed. If the float K were subjected to the action of the agitated water there would be an almost continual movement of the float K and the indicating body M when the water level Q was approaching the danger point. For this reason, the opening E into the interior of the tube C is constricted so as to permit only a slow movement of the float K, and thus to maintain a height of water in the interior of the tube C that corresponds approximately to the mean height of the water outside the said tube.

I do not desire to limit myself to the exact construction and arrangement of parts here shown, but aim in the appended claims to cover all modifications that are within the scope of my invention.

What I claim as new and desire to secure by Letters Patent of the United States is—

1. In an indicator for attachment to automobile radiators, a tubular body, an operatively connected float and indicating means, said indicating means being within said tubular body, said tubular body having a portion through which the said indicating means indicates, the distance of the said indicator from the said float being such that the indicator is held above the said portion when the water level within the radiator is normal and is displayed at said portion when the said water level drops below the safe operating level.

2. In an indicator attachment for automobile radiators, a tubular body closed at the lower end and extending into the water in the said radiator, an operatively connected float and indicating means both within the said tubular body, said tubular body having a portion through which the said indicating means indicates, an orifice below the water level in the said radiator, the area of the said orifice being small compared to the cross sectional area of the said tubular body, and a second orifice above the normal water level.

In witness whereof I have set my hand this 18th day of March, 1915.

FRED B. COREY.

Witnesses:
 Jos. A. Brooks,
 S. E. Bromer.